Figure 1:
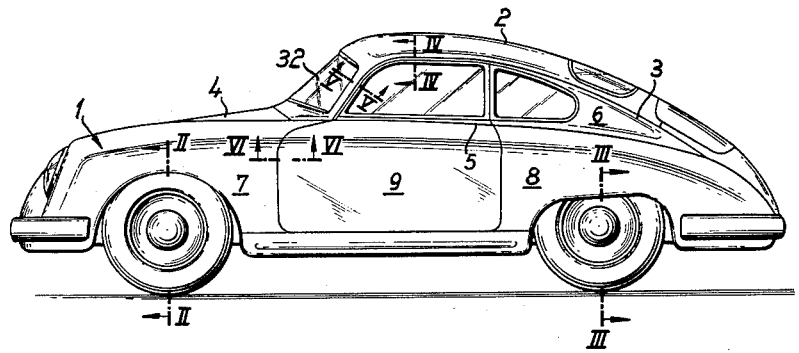

July 3, 1962     F. PORSCHE ET AL     3,042,444

MOTOR VEHICLE BODY CONSTRUCTION

Filed April 22, 1960     2 Sheets-Sheet 1

INVENTORS
FERDINAND PORSCHE
ERWIN KOMENDA
BY Dicke, Craig & Freudenberg
ATTORNEYS July 3, 1962   F. PORSCHE ET AL   3,042,444
MOTOR VEHICLE BODY CONSTRUCTION
Filed April 22, 1960   2 Sheets-Sheet 2
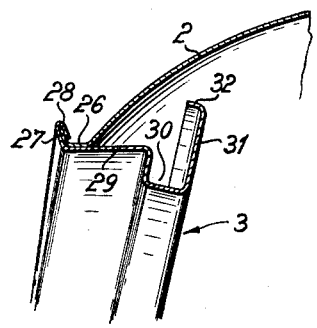
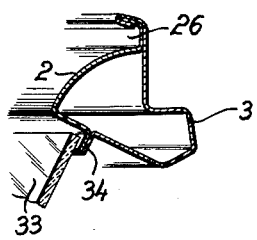
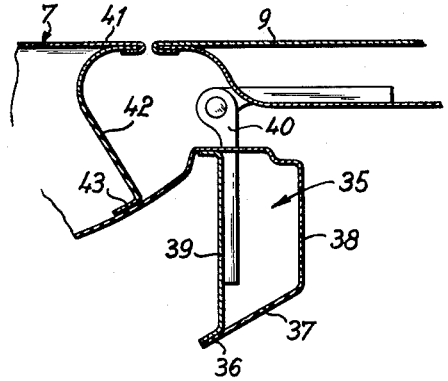
INVENTORS
FERDINAND PORSCHE
ERWIN KOMENDA
BY Dicke, Craig & Freudenberg
ATTORNEYS United States Patent Office 3,042,444
Patented July 3, 1962

3,042,444
MOTOR VEHICLE BODY CONSTRUCTION
Ferdinand Porsche, Stuttgart, and Erwin Komenda, Korntal, Germany, assignors to Dr. Ing. h.c. F. Porsche KG, Stuttgart-Zuffenhausen, Germany
Filed Apr. 22, 1960, Ser. No. 24,080
Claims priority, application Germany Apr. 25, 1959
2 Claims. (Cl. 296—28)

The present invention relates to a side-wall panel construction for a self-supporting type vehicle body of motor vehicles which extends in one piece over the entire length of the vehicle, includes the door aperture, and is provided with flanges for securing thereto adjoining pressed or stamped parts and/or for forming therewith bearer members of box-shaped cross-section.

Motor vehicle body constructions are known in the prior art which consists essentially of unitary side-walls and of a stamped roof part. The individual side wall parts are thereby provided along the edges thereof with flanges which form, in most sections thereof, box-shaped hollow bearer members together with further stamped parts as well as with the angularly-bent portions of the adjoining wall parts. The relatively great number of welding seams necessary in the prior art constructions not only requires high expenditures in connection with such constructions but also involves a danger of corrosion of the body which is very great corresponding to the large number of welded seams. Particularly, the welded seams of the box-shaped longitudinal bearer members which are exposed to or face the vehicle road surface entail an accumulation of dirt and are thereby exposed over relatively long periods of time, in an interrupted manner, to the humidity and dampness normally encountered.

A further difficulty usually occurs in connection with the handling of relatively large vehicle wall parts or body panels. It is known already in the prior art to provide the wall parts or panels with edge flanges for purposes of increasing the inherent rigidity thereof which edge flanges also serve during final assembly as securing flanges with the adjacent wall parts or body panels or with the additional stamped parts of the body. These flanges are relatively narrow so that the reinforcement of the stamped wall parts or panels obtained thereby is relatively slight.

The present invention aims at improving the handling of the side wall parts or panels by means of a far-reaching reinforcement thereof, at reducing the costs involved in the formation of the hollow longitudinal bearer member as well as at a physical relocation and displacement of the absolutely necessary welding seams out of the soiling danger zone.

This is achieved in accordance with the present invention in that sections of the side-wall edge or rim portions are stamped out in a U-shaped manner whereby the free leg portion of the stamping extends at a distance from the side-wall panel and is disposed essentially parallel thereto. By the use of such an arrangement, it is possible to achieve a construction which requires fewer stamped parts for the formation of the hollow, longitudinal bearer members and in which the welding seams are disposed exclusively along one side of the box-shaped bearer member. The reinforcement of the side-wall part or panel takes place in a manner corresponding to the size thereof whereby the largest part of the bearer member is already stamped out together with the wall part or panel of the body. The side-walls forming within the outer regions thereof the wheel casings are provided inwardly thereof with U-shaped, angularly-bent edge portions which form channels extending in the vehicle longitudinal direction. The open side of these channels is located on the side of the bearer member opposite the road surface and is closed off by means of a stamped part extending essentially horizontally and preferably forming the vehicle floor. As a result of such an arrangement, the otherwise necessary connecting flanges provided at the side of the longitudinal bearer member facing the road surface and therewith any corners that would otherwise collect dirt are effectively eliminated. The corrosion danger is also lessened thereby and the cost for the welding installations is reduced since the longitudinal bearer member in accordance with the present invention is composed exclusively of two stamped parts.

The stamped part thereby abuts against an angularly-bent rim of the free leg portion, bridges the open side of the U-shaped channel part and is arranged at the side wall part or body panel by means of an angularly-bent portion. However, it is also within the purview of the present invention and possibly also of advantage in connection therewith if the free leg portion of the stamping is extended by means of a separate stamped part the rim or edge of which is provided with a flange for supporting thereon a stamped part closing the channel.

The door aperture of the side-wall panel, preferably the hinge post or column is defined or limited by a stamping of channel-shaped configuration, open on one side only which is formed by the rim portion of the stamped wall part or panel. The opening of the channel-shaped stamping is closed off by another stamped part. The use of such an arrangement entails, in addition to the advantages already generally mentioned hereinabove, the elimination of connecting flanges within the region of the door aperture. Such an arrangement produces a smooth door-frame without any sharp-edged corners which otherwise might possibly be the source of damage to the clothes of the passengers and which in any event would have to be covered by additional covering means. The stamped part closing the channel is thereby formed by a web portion provided with angularly-bent rim flanges which abut against the free leg portion of the stamping as well as against the side wall body panel. The stamped part may thereby form the hinge support.

The U-shaped stamping consisting of one piece with the side wall body panel which bridges the door aperture and also supports thereon the roof extends with basically the same profile or cross-section along the windshield frame up to the cowl and forms within the region thereof together with the windshield frame the box-type column. The connecting flanges between the windshield frame and the channel-shaped rim part of the side wall body panel form, in an advantageous manner, the securing flange for the windshield and a rain water drain channel.

Accordingly, it is an object of the present invention to provide a vehicle body construction for a self-supporting-type body which avoids the disadvantages encountered in the prior art and which is simple and relatively inexpensive in manufacture and assembly, yet relatively sturdy so as to be capable to readily withstand all forces that many occur therein.

Another object of the present invention is the provision of a vehicle body construction which eliminates the necessity of numerous welded seams.

A further object of the present invention is the provision of a vehicle body construction which effectively eliminates the danger of corrosion thereof, particularly in those places where moist dirt thrown up from the road surface is likely to accumulate.

Still a further object of the present invention is the provision of a motor vehicle construction which facilitates handling of the relatively large body stampings by imparting thereto a sufficient rigidity.

Another object of the present invention is the provision of body stampings of relatively large dimensions which are stamped out in such a manner as to provide an increased inherent rigidity in these stampings.

Still another object of the present invention resides in the provision of a motor vehicle body construction in which a minimum of individual parts are used to form the self-supporting frame-like members of the body.

Another object of the present invention resides in the provision of a door aperture provided in the vehicle side wall parts which exhibits only smooth edges so as to avoid the danger of tearing the passengers' clothes and therewith also eliminates the requirement for a separate covering of such edges.

Figures 2, 3:
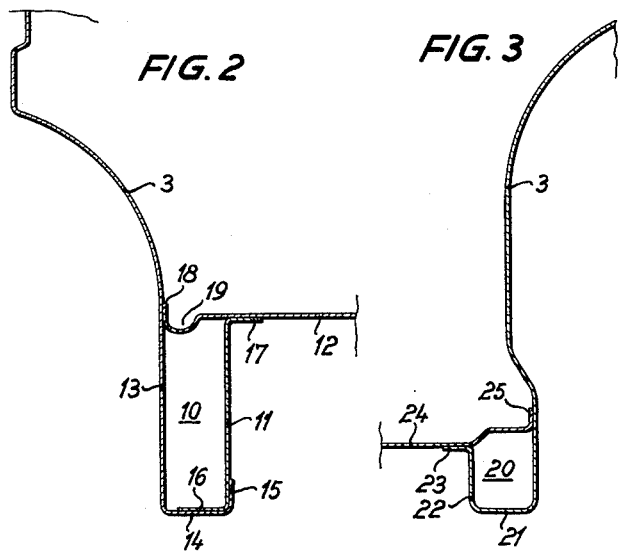

These and other objects, features and advantages of the present invention will become more obvious from the following description when taken in connection with the accompanying drawing which shows, for purposes of illustration only, one embodiment in accordance with the present invention, and wherein FIGURE 1 is a side elevation view of a passenger motor vehicle in accordance with the present invention, FIGURE 2 is an enlarged partial cross-sectional view taken along line II—II of FIGURE 1, FIGURE 3 is an enlarged partial cross-sectional view taken along line III—III of FIGURE 1, FIGURE 4 is an enlarged partial cross-sectional view taken along line IV—IV of FIGURE 1, FIGURE 5 is an enlarged partial cross-sectional view taken along line V—V of FIGURE 1, and FIGURE 6 is an enlarged cross-sectional view taken along line VI—VI of FIGURE 1.

Referring now to the drawing wherein like reference numerals are used throughout the various views to designate like parts, and more particularly to FIGURE 1, reference numeral 1 generally designates therein a passenger motor vehicle which includes a vehicle body consisting of several stamped body parts or body panels. In particular, the motor vehicle 1 is composed essentially of a stamped roof part 2, of stamped side wall parts 3 which are essentially of mirror image-like construction and of which only one is therefore shown in the drawing, and of a front hood 4. The side wall stamping 3 forms above the so-called belt line 5 of the motor vehicle the outer wall 6 thereof, as is known in the prior art, whereby the forward fender 7 and the rear fender 8 are arranged below the line 5 in the front and rear, respectively, of the motor vehicle. Within the regions of the fenders 7 and 8, the wall part 3 forms the inner walls of the wheel casings.

The side wall 3 is provided, among others, with a door aperture for the door 9 which door aperture is suitably cut out of the stamping. As a result thereof, additional beams or bearers which would have to be welded to the body and which would bridge the door aperture are obviated thereby.

The side wall body panel stamping 3 is reinforced in itself in accordance with the present invention by a plurality of edge flanges which are arranged within the edge regions of the stamping 3 and always have essentially the same basic shape or configuration. The edge flanges are constructed as a U-shaped stamping whereby the free leg portion of the channel formed thereby extends at a distance from the stamped part or body panel and also essentially parallel with respect thereto.

FIGURES 2 through 6 illustrate, on an enlarged scale, some examples of the construction of the edge or rim regions of the side wall panel 3 as well as the connections thereof with the adjoining stamped parts of the body.

FIGURE 2 illustrates the construction of the side wall as well as the formation of a hollow bearer member within the forward region of the vehicle. The hollow bearer member generally designated by reference numeral 10 (FIGURE 2) is limited or defined by the body panel of the side wall 3, by a web portion 11 and by a horizontal stamped part 12 representing a partition wall. The vertical wall portion 13 of the side wall panel 3 which forms the wheel casing inner wall is thereby provided with a horizontally extending angularly-bent portion 14 which terminates in an upright flange portion 15 spaced at a distance from the side wall portion 13. The flange 15 is extended by a web portion 11 which is supported with the flange 16 thereof against the angularly-bent flange portion 15. Additionally, the web portion 11 is provided with an angularly-bent flange portion 17 by means of which the web portion 11 is connected with the stamped part 12. The stamped part 12 thereby bridges the gap between the web portion 11 and the wall portion 13, and is secured at the latter by means of a flange 18. It is thereby advantageous to provide simultaneously a water drainage channel 19 within the stamped part 12 forming the partition wall.

The longitudinal bearer member generally designated by reference numeral 20 (FIGURE 3) is provided within the rear portion of the vehicle and is formed exclusively by two stamped parts. The side wall body panel 3 is thereby provided, in a manner similar to FIGURE 2, with a horizontal, angularly-bent portion 21 which is adjoined by an essentially vertical or upright web portion 22. The web portion 22 in turn is provided with a flange portion 23. The channel formed by the wall 3, by the angularly-bent portion 21 as well as by the web portion 22 is covered by means of a horizontal stamped part 24 whereby a box-shaped hollow bearer member 20 is produced thereby. The provision of a further stamped part, such as web portion 11 of FIGURE 2, is thereby obviated since the stamped part 24 extends at a slight distance from the angularly-bent portion 21. The stamped part 24 is also secured at the wall body panel 3 by means of a flange 25.

The connection of the side wall body panel 3 with the stamped roof part or panel 2 is illustrated in FIGURES 4 and 5. FIGURE 4 thereby illustrates the cross-section, on an enlarged scale, within the region of the door 9 whereby the connecting places between the stamped parts serve for the formation of a water drainage channel 26. The rim flange 27 of the stamped roof part 2 is thereby angularly-bent upwardly and is retained within the flanged rim 28 bent back upon itself of the side wall 3. The door folding 29 is provided with a U-shaped indentation 30 the inwardly-disposed leg portion 31 of which terminates in a reinforcing flange 32.

The basic profile of the door folding 29 is also present within the region of the windshield 33 (FIGURE 5) whereby the door folding 29 forms a box-type column together with the stamped roof part 2 which constitutes within this area the outer stamping of the windshield frame. The connecing piece between the stamped parts 2 and 3 forms, on the one hand, a drainage channel 26 and, on the other, the securing flange 34 for the windshield 33.

The hinge post or column generally designated by reference numeral 35 (FIGURE 6) is also formed by a U-shaped upright rim portion of the side wall body panel 3 whereby an essentially U-shaped web portion 39 extends from the edge 36 of the free leg portion 37 of the channel-shaped stamping 38 toward the oppositely disposed wall of the stamped part 3. The web portion 39 thereby complements the stamping 38 into a box-shaped bearer member. The web portion 39 also serves preferably for supporting thereon the hinges 40 of the door 9.

The fender generally designated by reference numeral 7 is also secured within the region of the hinge column 35 which fender 7 essentially consists of an outer wall 41 to which is secured by means of bent-back flanges a stamped part 42. The stamped part 42 is connected by means of flange 43 with the side wall 3 and is preferably detachably secured thereto.

While we have shown and described an embodiment in accordance with the present invention, it is understood that the same is not limited thereto but is susceptible of many changes and modifications within the spirit and scope of the present invention. We, therefore, do not wish to be limited to the details shown and described herein but intend to cover all such changes and modifications as are encompassed by the scope of the appended claims.

We claim:

1. A side-wall construction for a vehicle body, especially of the self-supporting type, for motor vehicles in which the side-wall body panel extends in one piece essentially over the entire length of the vehicle and is provided with a door aperture, said side-wall body panel including rim portions having flanges for connection with flanges of adjoining stamped body parts, at least some of the sections of the rim portions of said side-wall body panel being stamped out in an essentially U-shaped manner to form substantially parallel leg portions, one of which is free, said free leg portion extending at a distance from the side wall and essentially parallel thereto, said side-wall panel constituting within the outer regions thereof at least a part of the wheel casings, said wall panel comprising inwardly U-shaped angularly bent rim portions thereof, said last-mentioned rim portions extending essentially in the vehicle longitudinal direction and constituting channels, said channels being open on the side thereof opposite the road surface, and an essentially horizontally-extending stamped body part closing off the open side of said channel.

2. A side-wall construction according to claim 1, wherein said essentially horizontally-extending body part forms the vehicle floor.

References Cited in the file of this patent

UNITED STATES PATENTS

| 2,202,859 | Ledwinka | June 4, 1940 |
| 2,254,458 | Swallow | Sept. 2, 1941 |

FOREIGN PATENTS

| 812,475 | France | Feb. 1, 1937 |
| 964,469 | Germany | May 23, 1957 |
| 626,305 | Great Britain | July 13, 1949 |
| 209,058 | Switzerland | June 1, 1940 |